United States Patent
Mayer

(10) Patent No.: US 11,034,556 B2
(45) Date of Patent: Jun. 15, 2021

(54) METHOD OF MONITORING AT LEAST ONE CRANE

(71) Applicant: LIEBHERR-WERK BIBERACH GMBH, Biberach an der Riss (DE)

(72) Inventor: Joachim Mayer, Biberach (DE)

(73) Assignee: LIEBHERR-WERK BIBERACH GMBH, Biberach an der Riss (DE)

( * ) Notice: Subject to any disclaimer, the term of this patent is extended or adjusted under 35 U.S.C. 154(b) by 312 days.

(21) Appl. No.: 16/077,701

(22) PCT Filed: Feb. 10, 2017

(86) PCT No.: PCT/EP2017/000188
§ 371 (c)(1),
(2) Date: Aug. 13, 2018

(87) PCT Pub. No.: WO2017/137166
PCT Pub. Date: Aug. 17, 2017

(65) Prior Publication Data
US 2019/0071289 A1    Mar. 7, 2019

(30) Foreign Application Priority Data
Feb. 12, 2016   (DE) .................... 10 2016 001 684.1

(51) Int. Cl.
*B66C 15/04*    (2006.01)
*B66C 13/08*    (2006.01)
(Continued)

(52) U.S. Cl.
CPC .............. *B66C 15/045* (2013.01); *B66C 1/00* (2013.01); *B66C 13/085* (2013.01); *B66C 13/46* (2013.01); *B66C 1/14* (2013.01)

(58) Field of Classification Search
CPC ......... B66C 1/00; B66C 15/045; B66C 13/46; B66C 13/085; B66C 1/14; B64C 39/024; B64C 2201/123
See application file for complete search history.

(56) References Cited

U.S. PATENT DOCUMENTS 4,408,195 A    10/1983   Tullis et al.
9,162,753 B1 * 10/2015   Panto .................. G08G 5/0069
(Continued)

FOREIGN PATENT DOCUMENTS

CN    102275827 A    12/2011
DE    10202399 A1    8/2003
(Continued)

OTHER PUBLICATIONS

Vaughan; "Control of Tower Cranes with Double-Pendulum Payload Dynamics"; IEEE Transactions on Control Systems Technology, vol. 18, No. 6; pp. 1345-1358; 2010 (Year: 2010).*
(Continued)

*Primary Examiner* — Stephen Holwerda
(74) *Attorney, Agent, or Firm* — McCoy Russell LLP

(57) ABSTRACT

Methods and systems for monitoring at least one crane, preferably two or more cranes, in particular revolving tower cranes, on a construction site, wherein one or more optical detection means are provided, and wherein a collision monitoring unit analyzes the recorded optical data to recognize a possible collision between at least one crane and one further crane and/or another projecting edge.

17 Claims, 1 Drawing Sheet

(51) Int. Cl.
  *B66C 13/46* (2006.01)
  *B66C 1/00* (2006.01)
  *B66C 1/14* (2006.01)

(56) References Cited

U.S. PATENT DOCUMENTS

| | | | |
|---|---|---|---|
| 9,738,493 | B2 | 8/2017 | Fenker et al. |
| 9,856,662 | B2 | 1/2018 | Vierkotten et al. |
| 2009/0008351 | A1* | 1/2009 | Schneider .............. B66C 13/46 212/272 |
| 2010/0039319 | A1 | 2/2010 | Cameron |
| 2010/0103260 | A1 | 4/2010 | Williams |
| 2013/0216089 | A1* | 8/2013 | Chen ..................... G06T 7/0002 382/100 |
| 2013/0345857 | A1* | 12/2013 | Lee ........................ B66C 13/48 700/229 |
| 2015/0329333 | A1 | 11/2015 | Fenker et al. |
| 2016/0031680 | A1 | 2/2016 | Deplace |

FOREIGN PATENT DOCUMENTS

| | | |
|---|---|---|
| DE | 202005002315 U1 | 6/2005 |
| DE | 102012007940 A1 | 10/2013 |
| DE | 202012012116 U1 | 4/2014 |
| DE | 102014009165 A1 | 12/2015 |
| EP | 0596330 A1 | 5/1994 |
| GB | 2205463 A | 12/1988 |
| JP | 2003327388 A | 11/2003 |
| JP | 2006282337 A | 10/2006 |
| JP | 2007323112 A | 12/2007 |

OTHER PUBLICATIONS

Gu; "Research on Intelligent Monitoring and Protection System of Distributive Muli-Tower Cranes"; 2010 International Conference on Computer Application and System Modeling (ICCASM 2010); pp. 540-543 (Year: 2010).*
Hwang; "Ultra-wide band technology experiments for real-time prevention of tower crane collisions"; Automation in Construction 22; pp. 545-553; 2012 (Year: 2012).*
Hussein; "Variable Gain Control of Elastic Crane Using Vision Sensor Data"; 2012 12th International Conference on Control, Automation, Robotics & Vision; pp. 1783-1788; 2012 (Year: 2012).*
ISA European Patent Office, International Search Report Issued in Application No. PCT/EP2017/000188, dated Apr. 20, 2017, WIPO, 6 pages.

* cited by examiner

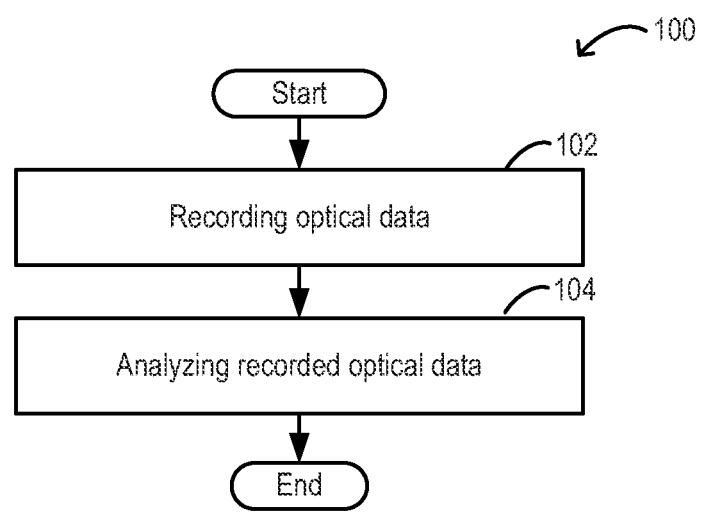

METHOD OF MONITORING AT LEAST ONE CRANE

CROSS-REFERENCE TO RELATED APPLICATIONS

The present application is a U.S. National Phase of International Patent Application Serial No. PCT/EP2017/000188, entitled "METHOD OF MONITORING AT LEAST ONE CRANE," filed on Feb. 10, 2017. International Patent Application Serial No. PCT/EP2017/000188 claims priority to German Patent Application No. 10 2016 001 684.1, filed on Feb. 12, 2016. The entire contents of each of the abovementioned applications are hereby incorporated by reference in their entirety for all purposes.

TECHNICAL FIELD

The invention relates to a method of monitoring two or more cranes, in particular revolving tower cranes, on a construction site.

BACKGROUND AND SUMMARY

The operation of the crane and the control of the lifting hook, with or without a suspended load, typically takes place by crane operators who are either in the crane cabin, on a control stand, or on the ground in the working region of the crane. The best overview over the construction site is ensured from the crane cabin; however, the distance between the crane operator and the lifting hook is usually so large that an exact traveling of a load to be positioned or of the lifting hook is difficult. In addition, it frequently occurs that the lifting hook is in a region that cannot be seen or can only be seen in a limited manner by the crane operator. For example when the lifting hook dips behind a building edge, the direct line of sight to the load from the crane cabin is blocked. In these cases, instruction is usually given by a second person.

A further possibility is the control of the crane via a radio remote control that permits the operator to leave the crane operator cabin to move to a more favorable position with a better view of the load or of the lifting hook. However, this causes movements of the persons over the construction site that are difficult in part or possibly dangerous.

A further aspect of the invention is the avoidance of possible collisions of the crane with other objects or with other cranes on the construction site. To avoid impending collisions between two or more cranes on one and the same construction site, corresponding anti-collision systems have previously been used. The previous anti-collision systems (ACS) are frequently developed and supplied by third-party suppliers and are only installed in revolving tower cranes on construction sites as required.

An external interface is provided for the integration of the ACS in the crane where the third-party suppliers can couple their modules for the anti-collision systems and can pick up the required crane data. These data above all include the current slew angle, the trolley position, or the lowered height of the load taken up. The data picked up via the interface are processed in a calculation module to determine the possible collision risk and to output it in good time. If an impending collision risk is recognized, all the cranes on the construction site are switched off. Particularly with a plurality of cranes on the construction site, the probability of such a shut-down scenario is not small and the switching off of all the cranes, i.e. not only the cranes at risk of collision, results in a huge disruption in the working operation of the construction site. This in turn results in a much worse acceptance of such systems among crane operators.

With these systems, a recognition of the load position or of the load movement is furthermore only possible in the rigid state since deformations of the load-bearing structure or possible oscillations of the hoist rope that occur during the typical crane movement cannot be recognized via the data exchanged over the interface. In addition, risks of collision are only recognized between cranes that are equipped with a corresponding ACS. Impending collisions with other objects on the construction site such as vehicles, buildings, components, or even persons moving about can be neither detected nor recognized.

A suitable method is consequently looked for that enables an improved monitoring of a crane or an improved monitoring of a plurality of cranes for the carrying out of an anti-collision monitoring.

BRIEF DESCRIPTION OF THE DRAWING

FIG. 1 depicts a flow chart of steps of an exemplary method of the application.

DETAILED DESCRIPTION

This object is achieved by means of a first aspect of the invention in which two or more cranes, in particular revolving tower cranes, on a construction site, are monitored by one or more optical detection means, wherein a collision monitoring unit analyzes the recorded optical data to recognize a possible collision between at least one crane and one further crane and/or another projecting edge.

In accordance with the invention, a method of monitoring at least one crane, preferably two or more cranes, in particular revolving tower cranes, on a construction site is proposed. One or more optical detection means are used for this purpose to observe relevant components of one or more cranes. The detection means generate optical data that are forwarded to a collision monitoring unit. It receives the optical data of the one or more detection means and analyzes them by means of a suitable recognition algorithm. Possible collisions between at least one crane and an object, for example a further crane or another projecting edge such as construction site vehicles, buildings, trees, or persons are recognized by the analysis.

The crane and also the closer environments should be observed by the one or more detection means. Not only collisions with other crane can thereby be reliably predicted, but also with other objects. The collisions can be prevented by early intervention of the collision monitoring unit in the respective crane control, with in this case the directly affected cranes being able to be switched off. Other cranes, that are admittedly likewise observed by the detection means, but are not directly affected by the risk of collision, can continue to work without risk.

The collision monitoring unit optionally communicates via a suitable crane interface with the crane control of at least one crane on the construction site. In the case of a recognition of an impending collision, possible control signals are transmitted from the collision monitoring unit to the crane control of the affected crane to effect a delay-free switching off of the crane movements. It is likewise conceivable that crane movement data are transmitted from the crane control to the collision monitoring unit via the interface to additionally take these into account for the collision recognition, for example to verify the analyzed image data. This can improve the early prediction of danger situations.

These data, that are transmitted from at least one crane control to the collision monitoring unit, for example, include current crane parameters of the crane operation that preferably represent the current slew angle of the boom in the top-slewing crane, the current trolley position, or the lowered height of the load taken up.

In accordance with a preferred embodiment, the one or more optical detection means can be fixedly or releasably arranged at the crane structure of a crane. It is in particular conceivable to associate separate optical detection means with different crane components or to install them on the different crane components; for example, a respective optical detection means can be provided at the boom and/or at the counter-boom and/or at the trolley and/or at the lifting hook and/or at a slewing platform with bottom-slewing cranes. There is equally the possibility of installing one or more detection means in the environment of a crane.

Provision can alternatively or additionally be made that one or more optical detection means are designed in the form of mobile detection means that are neither fixedly arranged at the crane structure nor at any other third-party object of the construction site. Instead, such mobile detection means are moved during the crane running time to monitor relevant crane components in dependence on the application and on the situation and to transmit image information in this regard to the collision monitoring unit. Flying detection means that can also detect crane points or components that are difficult to access in close proximity and can thus generate sufficiently precise data for the subsequent data analysis have proven to be particularly preferred.

The optical detection means have one or more suitable image sensors or cameras for recording the crane components or for crane environment. 3-dimensional cameras are ideally used.

In accordance with the preferred embodiment variant using mobile detection means, an automated control of the movement apparatus of the mobile detection means is desirable to free up the crane operator from the additional control of the detection means. It can always be ensured by the automated control of the mobile detection means that the latter has an ideal observation position of the relevant crane components depending on the situation. In this connection, a control of the mobile detection means synchronized with the regular crane control is conceivable. For example, the control of the mobile detection means can be synchronized with the movement of a lifting hook. The detection means thereby moves synchronously along with the lifting hook, whereby an ideal observation position is always ensured. This is, however, only one embodiment; a synchronous control is possible with each movable crane component of the crane, thus, for example, also with the boom, the trolley, or other components.

It is possible by the collision monitoring unit in accordance with the invention and by the subsequent analysis of the optical data to detect dynamic deformations of the crane structure and to likewise take them into account for the collision monitoring. The same applies to possible oscillating movements of the hoist rope that were not detectable by previous systems. The imaging observation and the subsequent image analysis additionally permits a successful recognition of any oscillating movements of the load or of the crane components associated therewith.

While existing systems do not allow for an exact detection of the load taken up, the methods described herein allow for the specific load contour to be taken into account with the aid of the image material. The actual load contour can also be taken into account for the collision monitoring with the aid of the method in accordance with the invention.

The subject matter of the present invention also relates to a method of monitoring and/or inspecting at least one crane. In accordance with the invention, a mobile optical detection means, in particular a flying optical detection means, is used for the monitoring and/or inspecting of the crane. It travels/ flies over the crane components to be monitored and thus always permits an ideal observation position relative to the observed components. The generated optical data can be transmitted to an evaluation unit, to a crane operator cabin, or directly to the crane control.

The crane operator can comfortably remain at his conventional workplace and does not have to rely on information from a third-party in specific operating situations. A temporary leaving of the crane operator cabin becomes superfluous. Instead, the detected observation data of the mobile detection means are displayed to him on a monitor of the crane operator cabin so that he has an ideal observation position for the crane control from there. Such a mobile detection means in particular collects image information that are recorded with the aid of a camera, preferably a three-dimensional camera.

The mobile detection means can be designed as a multi-copter that is equipped with corresponding image recording sensors and comprises a corresponding communication module to transmit the optical data to the crane control or to the crane operator cabin.

An automatic control of the detection means synchronized with the regular crane control is also provided here to always ensure the ideal observation position of the detection means. The crane operator accordingly does not yet have to deal with the control of the detection means, but can rather fully concentrate on the crane control. The detection means is synchronously moved along with a moved crane component. The image information on the control-relevant crane components are transmitted to a display in real time.

It is also conceivable that the synchronized control of the detection means takes place with the aid of a wireless communication link between the mobile detection means and the crane component to be observed. Lifting hooks and detection means can, for example, be in radio communication. The detection means is also moved in an automated manner on an actuation of the lifting hook.

In addition to the method in accordance with the invention, the present invention likewise relates to a system for collision monitoring of one or more cranes, wherein the system is suitable for carrying out the method of monitoring two or more cranes, in particular revolving tower cranes, with one or more optical detection means. The monitoring may include a collision monitoring unit that analyzes recorded optical data to recognize a possible collision between at least one crane and another crane, projecting edge, load, or third-party object. The collision monitoring unit may communicate with the crane control of at least one crane via a suitable crane interface. In some aspects, the collision monitoring unit may transmit immediate stop instructions to the crane control of the monitored crane in the event that a potential collision is detected. Along with the recorded image data, the collision monitoring unit may take one or more of the current slew angle, the trolley position, the lowered height of the load of the crane taken up into consideration in order to determine collision potential. In some aspects, the collision monitoring unit may detect dynamic deformation of at least one of the dynamic deformation of the crane bearing structure or oscillations movements of the hoist rope through analysis of the optical data obtained from the optical detection means. The optical detection means may be arranged at the crane structure of a crane on one or more crane components including, but not limited to, the boom, the counter-boom, the trolley, the lifting hook, or stewing platform. In some aspects, the optical detection means may be an image sensor including a camera such as a 3D camera. In some aspects, one or more of the optical detection means may be a mobile optical detection means such as a flying optical detection means. In further aspects, the movements of the flying optical detection means may be synchronized with the movements of the crane or portion of the crane being monitored. The advantages and properties of the system obviously correspond to those of the method in accordance with the invention so that a repeat description will be dispensed with.

Described herein is a method for monitoring and/or inspecting the crane components of at least one crane relevant to crane monitoring, control or inspection through the use of one or more mobile detection means. Such mobile detection means may include, for example, a flying optical detection means. The position of the mobile detection means may be moved automatically and/or synchronously with the movement of the crane. In some examples, the mobile flying means moves synchronously with the actuation of the lifting hook. In one aspect, communication between a crane component and the mobile detection means may be exchanged wirelessly. Such communication may allow for the exchange of control data for the synchronization of the movement of the mobile detection means and the crane component. In one aspect, image data transmitted from the at least one mobile optical detection means to the crane control is used for the automatic crane control.

The invention will be explained in more detail again in the following with reference to two embodiments. The variant for the collision monitoring will first be described. The idea in accordance with the invention starts from the fact that the current situation on the construction site is detected by means of one or more cameras that are fastened in the environment of the crane or alternatively to the components of the crane and of the suspended load. Cameras are in particular installed at the boom, at the counter-boom, at the trolley, at the lifting hook, or also at the slewing platform with bottom slewers. They monitor the respective components and transmit their observation data, i.e. the image data, to a central collision monitoring unit. It carries out a collision monitoring by means of image analysis processes, with impending collisions being recognized at an early time using the transmitted image information. On the one hand, not only collisions between the individual cranes of the construction site can thereby be detected, but a risk of collision of a crane with other buildings, components, devices, or also persons on the construction site can also be recognized.

In addition, the system in accordance with the invention and the method in accordance with the invention offer the advantage that risks can also be recognized that arise due to the contours of the suspended load, e.g. long components, for instance. The evaluation of the image data furthermore permits a recognition of risks during the crane operation, independently of the type of the crane movement, of the dynamic deformations of the crane structure and possible oscillation movements of the hoist rope.

In addition to the fixedly arranged cameras at the individual crane components, a mobile detection unit in the form of a multicopter can, however, also be used. Such a multicopter is equipped with cameras to observe all the environmental sections in a controlled manner from the air.

A further embodiment of the invention will be explained in the following; however, the aspects of the multicopter also apply to a use of the multicopter for collision monitoring.

The solution in accordance with the invention for monitoring and inspecting a crane is the use e.g. of at least one multicopter that brings about the following advantages due to the equipping with a camera and with different control possibilities. An ideal view of the load from a small distance and in a favorable observation position can always take place by the multicopter. It ensures good tracking of the load during the crane movement and the lifting hook. The presentation of the recorded image data of the multicopter can take place at the crane operator's monitor.

The multicopter is furthermore controlled automatically and synchronously with the lifting hook so that an ideal observation position is always ensured. The synchronous control of the multicopter takes place by wireless communication between the lifting hook and the multicopter, with the option of intervening manually as required and of changing the position or direction of view of the multicopter.

It is further conceivable that the control of the lifting hook is also automated, with the supplied image data of the multicopter being used for an automated control. A recognition of the hook position can also take place by cableless monitoring systems and an automatic control of the crane movement by the definition of the placement position can take place using the multicopter, thus e.g. via spatial coordinates. In the final analysis, the use of a multicopter provides an almost completely automated crane operation.

The use of the multicopter with a camera is furthermore suitable to considerably simplify the inspection of the installed crane and to make it possible at all at points that are difficult to access. The guying of trolley boom cranes that can only be inspected with a very big effort must be mentioned here. Both the components and connection means can be directly inspected by being flown over by a camera that delivers a corresponding image quality and can thus, for example, be examined for completeness (bolts, screws, spindle), cracks, corrosion damage, hole clearance.

FIG. 1 depicts an embodiment of a method of the application. The exemplary method 100 includes a step 102 of recoding optical data and a step 104 of analyzing optical data.

The invention claimed is:

1. A method of monitoring two or more cranes on a construction site comprising:
   recording optical data from one or more optical detector,
   analyzing the recorded optical data to recognize a possible collision between at least one crane and one further crane and/or another projecting edge, and
   detecting dynamic deformations of a crane structure and oscillation movements of a hoist rope by analyzing the recorded optical data, and taking into account the dynamic deformations of the crane structure and oscillation movements of the hoist rope to avoid a possible collision.

2. The method in accordance with claim 1,
   further comprising transmitting the analyzed data to a crane control of at least one of the two or more cranes via a suitable crane interface, and
   transmitting control signals to the crane control of the least one crane including a control signal for an immediate crane stop on a recognition of a collision case.

3. The method in accordance with claim 2, further comprising invoking control information via the interface of at least one crane, wherein the control information is at least one of a current slew angle, a trolley position, a lowered height of a load of the crane taken up, and taking the control information in addition to the optical data, into account in the recognition of possible collisions.

4. The method in accordance with claim 1, wherein the recording optical data is performed at the crane structure of a crane.

5. The method of claim 4, wherein the recording optical data is performed from at least one of a boom, a counter-boom, a trolley, a lifting hook, and a slewing platform.

6. The method in accordance with claim 1, wherein the recording optical data is performed by image sensors.

7. The method of claim 6, wherein the recording optical data is performed by is a 3-dimensional camera.

8. The method in accordance with claim 1, wherein the recording optical data is performed by mobile detectors.

9. The method of claim 8, further comprising automatically controlling the mobile detectors in synchrony with control of at least one crane.

10. The method in accordance with claim 1, further comprising detecting dynamic deformations of the crane structure and/or oscillation movements of the hoist rope by analysis of the optical data and taking into account takes the dynamic deformations of the crane bearing structure and/or oscillation movements of the hoist rope for following collision monitoring.

11. The method in accordance with claim 1, further comprising recognizing potential collisions of a load contour with third-party objects and/or cranes.

12. A method for monitoring and/or inspecting at least one crane, the method comprising:

monitoring and/or inspecting to optically detect crane components relevant to the crane monitoring and/or inspecting or control of the crane using flying optical detectors, and moving the flying optical detectors synchronously with movement of a crane component to maintain an observation position.

13. The method in accordance with claim 12, wherein the monitoring and/or inspecting is performed automatically and synchronously with at least part of the crane.

14. The method of claim 13, wherein the monitoring and/or inspecting is controlled automatically and synchronously with the actuation of a lifting hook.

15. The method in accordance with claim 12, further comprising exchanging required control data for the synchronized movement of the mobile detector using a wireless communication link positioned between at least one crane component and at least one mobile detector.

16. The method in accordance with claim 12, further comprising transmitting image data from at least one mobile optical detector to the control of the crane, and taking the transmitted data into account for automatic crane control.

17. A system for collision monitoring of one or more cranes comprising:

one or more optical detection means;
a collision monitoring unit; and
a crane interface;
wherein one or more of the optical detection means are arranged at a crane structure of a first crane, and one or more of the optical detection means are flying optical detectors which move synchronously with movement of a crane component to maintain an observation position;
wherein the crane structure is at least one of a boom, counter-boom, trolley, lifting hook, and slewing platform; and
wherein images acquired from the one or more optical detection means are combined by the collision monitoring unit with information from the crane interface to determine collision potential of the first crane with a second object.

* * * * *